(12) United States Patent
Geissler et al.

(10) Patent No.: US 6,904,652 B2
(45) Date of Patent: Jun. 14, 2005

(54) UNIVERSAL MACHINE TOOL

(75) Inventors: Alfred Geissler, Pfronten (DE); Reinhold Seitz, Hopferau (DE)

(73) Assignee: Deckel Maho GmbH, Pfronten (DE)

( * ) Notice: Subject to any disclaimer, the term of this patent is extended or adjusted under 35 U.S.C. 154(b) by 0 days.

(21) Appl. No.: 10/875,447

(22) Filed: Jun. 23, 2004

(65) Prior Publication Data

US 2004/0231473 A1 Nov. 25, 2004

Related U.S. Application Data

(63) Continuation of application No. 10/327,305, filed on Dec. 20, 2002, now abandoned, which is a continuation of application No. 09/552,771, filed on Apr. 20, 2002, now abandoned.

(30) Foreign Application Priority Data

Apr. 21, 1999 (DE) .......................................... 199 18 082

(51) Int. Cl.[7] ................................................. B23P 23/02
(52) U.S. Cl. ........................ 29/27 C; 409/167; 409/221; 82/122; 74/813 R; 310/67 R
(58) Field of Search .............................. 29/27 C, 27 R; 409/216, 165, 201, 141, 221, 224, 167; 483/14, 18–19; 901/36–37, 41; 74/813 R; 108/20, 139; 310/67 R; 82/122

(56) References Cited

U.S. PATENT DOCUMENTS

| | | | |
|---|---|---|---|
| 2,393,696 A | | 1/1946 | Kraut et al. |
| 3,460,435 A | * | 8/1969 | Dahl et al. .................. 409/183 |
| 3,587,390 A | * | 6/1971 | Lohneis et al. ............. 409/221 |
| 4,118,844 A | * | 10/1978 | Matsuzaki et al. .......... 29/27 C |
| 4,148,235 A | * | 4/1979 | Gerth ........................ 74/89.36 |
| 4,571,814 A | | 2/1986 | Palfery et al. |
| 4,635,329 A | | 1/1987 | Holy et al. |
| 4,716,647 A | | 1/1988 | Winkler et al. |
| 4,951,376 A | | 8/1990 | Grund |
| 4,987,668 A | * | 1/1991 | Roesch ....................... 409/165 |
| 5,020,201 A | * | 6/1991 | Kitamura .................... 29/27 C |
| 5,058,261 A | | 10/1991 | Kitamura |
| 5,222,283 A | | 6/1993 | Laschet |
| 5,239,892 A | | 8/1993 | Sakai |

(Continued)

FOREIGN PATENT DOCUMENTS

| | | |
|---|---|---|
| DE | 36 20 343 | 3/1987 |
| DE | 3615784 A1 * | 11/1987 |
| DE | 37 21 610 | 1/1989 |
| DE | 38 15 380 | 11/1989 |
| DE | 195 33 320 | 3/1997 |
| EP | 0 340 681 | 11/1989 |
| EP | 0 369 232 | 5/1990 |
| EP | 0 664 176 | 7/1995 |
| EP | 0 810 062 | 12/1997 |
| EP | 0 827 807 | 3/1998 |
| JP | 4-289058 | 10/1992 |
| JP | 5-293732 A * | 11/1993 |
| WO | WO 96/09913 | 4/1996 |
| WO | WO 96/12582 | 5/1996 |

Primary Examiner—Erica Cadugan
(74) Attorney, Agent, or Firm—The Maxham Firm

(57) ABSTRACT

A universal machine tool having a workpiece slide movable on a machine bed by means of a motor for the workpieces to be machined and a machining unit which is movable about a plurality of axes by means of a motor. The machining unit includes a motor-driven work spindle for receiving the machining tools. To enable turning operations in addition to milling and drilling operations with high cutting performance in a single clamping position, according to the present invention, the workpiece slide is provided with at least one rotatable workpiece accommodation and an associated rotary drive means. The rotary drive means can drive the workpiece accommodation for carrying out turning operations on the workpiece to be machined.

7 Claims, 4 Drawing Sheets

U.S. PATENT DOCUMENTS

| | | |
|---|---|---|
| 5,343,604 A | 9/1994 | Takagi |
| 5,351,376 A | 10/1994 | Kitamura |
| 5,490,307 A | 2/1996 | Link |
| 5,509,752 A | 4/1996 | Kocisek |
| 5,549,019 A * | 8/1996 | Cattani ........................ 409/141 |
| 5,688,084 A | 11/1997 | Fritz et al. |
| 5,727,296 A | 3/1998 | Kobler |
| 5,815,902 A | 10/1998 | Osterried et al. |
| 5,882,158 A | 3/1999 | Lechleiter et al. |
| 5,933,933 A * | 8/1999 | Fritz et al. .................. 29/33 P |
| 5,964,016 A | 10/1999 | Ito et al. |
| 6,229,637 B1 | 5/2001 | Suzuki et al. |

* cited by examiner

UNIVERSAL MACHINE TOOL

This application is a continuation of application Ser. No. 10/327,305, filed Dec. 20, 2002, now abandoned, which is a continuation of application Ser. No 09/552,771, filed Apr. 20, 2000, also now abandoned.

BACKGROUND OF THE INVENTION

1. Field of the Invention

The present invention relates generally to a universal machine tool and more specifically to a universal machine tool having a machining unit and a workpiece slide. The machining unit is movable along a plurality of axes by means of a motor and includes a motor-driven work spindle for receiving the machining tools. The workpiece slide is for the workpieces that are to be machined and is movable on a machine bed by means of a motor.

2. Discussion of the Prior Art

In a conventional universal milling, drilling, and boring machine, such as that disclosed in European Patent 0 664 176, the work spindle is carried by a swiveling milling head which is turnable about a locating face that is inclined by 45 degrees with respect to the vertical plane. The milling head is located on a vertical face wall of a support housing. The support housing is attached to the face of a travelling stand so as to be vertically movable. The travelling stand is mounted on guiding rails in the rear end of a machine bed so as to be movable by means of a motor. On the front part of the machine bed, a table slide having a workpiece table is located so as to be horizontally movable. With such an arrangement for the machine tool, complex milling, drilling, and threading operations may be carried out on a plurality of sides of a workpiece, in a single clamping position. However, no turning operations can be carried out with such a machine. This includes a rotary main cutting motion by the workpiece.

Conventional turning machines having tool revolvers into which smaller boring or milling heads may be inserted are well known. In these, however, the moving capabilities and the cutting performance of the milling heads are limited and driving these machines is relatively complicated. The range of applications of such milling and drilling heads in turning machines is therefore limited.

One would prefer a universal machine tool which, in addition to milling and drilling operations with high cutting performance, also enables turning operations for a complete automatic machining of workpieces in one clamping position.

SUMMARY OF THE INVENTION

According to the present invention, a workpiece slide is disclosed with at least one turnable workpiece accommodation and an associated rotary drive by which the workpiece accommodation can be driven for carrying out turning or lathing operations on the workpiece to be processed. As is understood by those skilled in the art, turning and lathing are used interchangeably.

The universal machine tool according to the present invention provides the possibility to carry out turning operations by means of a rotary main cutting motion by the workpiece, in addition to milling, drilling, and threading operations by means of a rotary main cutting motion by the tool. In this way, an effective, automatic complete machining of workpieces of even complicated shapes may be effected without any complicated re-clamping of the workpieces between a turning and a milling or drilling machine. By avoiding the re-clamping of the workpieces, a higher machining accuracy is obtainable. Another important advantage of the machine tool of the present invention is that the travelling paths of a work spindle provided for milling and drilling may also be used for the feeding and supply motions for turning operations, whereby the complexity of the construction and control technology may be decreased. Aside from the milling technology, the turning technology may also be covered by one control with the same user interface.

The workpiece accommodation may, for example, be formed as a horizontal rotary spindle including workpiece clamping means. In a particularly robust and stiff embodiment, the rotary spindle is, for example, borne in a spindle head integrally formed with the workpiece slide. The rotary spindle may, however, also be disposed in a separate spindle head which can be mounted on a workpiece slide if required. The arrangement enables a simple retrofit or detachment of the rotary spindle for possibly changing machining tasks.

In addition to or instead of the horizontal rotary spindle, the workpiece slide may also include a horizontal workpiece table which is turnable about a vertical axis and includes an integrated rotary drive as a workpiece accommodation. With a machine tool having such a workpiece slide, milling and turning operations can be carried out in one clamping position even on larger or bulky workpieces. Thus, the range of applications of the machine tool can be widened, and machining accuracy may be enhanced.

The workpiece accommodation may, for example, be driven by a ring-shaped driving motor comprising a stator ring fixed, for example, to a console of the workpiece slide and a rotor ring fixed to the turntable resulting in a particularly compact embodiment. The driving motor may, for example, be a collectorless ring-shaped torque motor enabling a direct drive with high dynamics and exact positioning without an additional gearing or coupling. The workpiece accommodation may, with such little spatial requirements and weight, not only be driven with high dynamics for carrying out turning operations, but may also be positioned in arbitrary angular positions to carry out, for example, special milling or drilling operations.

In another preferred embodiment of the present invention, a workpiece exchanger that can be inserted into the work spindle is provided. Since the work spindle can carry out all of the movements required for a workpiece exchange at the rotary spindle, no separate driving motors or travelling elements are necessary in this case. The workpiece exchanger may, for example, be a workpiece gripper provided with a plurality of gripper arms by which the finished workpieces are transported from the rotary spindle to a workpiece deposit. The rotary spindle may also be supplied with new workpieces via the workpiece gripper. A rod feeding magazine may also be provided by which the turning spindle is supplied with rod-shaped material.

In a simple and effective embodiment, the workpiece gripper may operate via an internal coolant supply in the work spindle. This way, additional operational components may be omitted.

Also, an automatically operable three or more jaw chuck may be located on the rotary spindle. The rotary spindle, however, may also have an internal clamping cone for receiving different power jaw chucks.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

Figure 1:
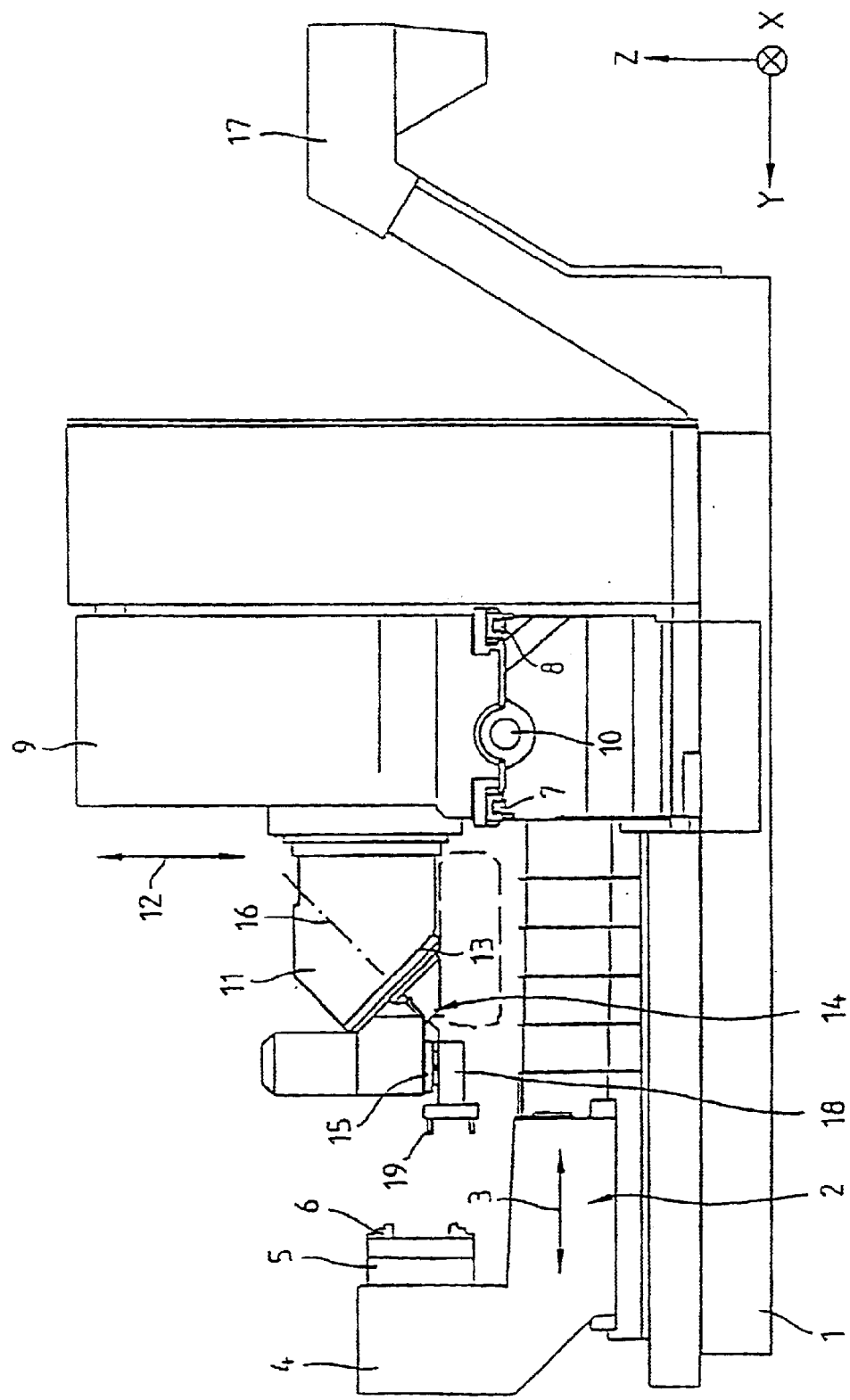
FIG. 1 is a perspective side view of a universal machine tool for milling, drilling, and turning operations according to the present invention.

The universal machine tool shown in FIG. 1 includes a machine bed 1 on which a workpiece slide 2 is disposed so as to be movable along a y-axis in the direction of the double arrow 3 by means of a motor (not shown). The workpiece slide includes a spindle head 4 which bears a horizontal rotary spindle 5 which is driven by means of a driving motor (not shown). The rotary spindle is provided with an automatically operable three jaw chuck 6 as a means for clamping workpieces. The rotary spindle may, however, also be provided with other workpiece clamping means and/or an internal clamping cone for receiving different power jaw chucks or the like.

On the rear part of the machine bed 1 are mounted guiding rails 7 and 8 on which a travelling stand 9 is guided so as to be horizontally movable along an x-axis via a motor-driven threaded spindle 10. On the front side of the travelling stand is a support housing 111 that is vertically movable up and down along a z-axis in the direction of the double arrow 12. The support housing has a face wall 13 that is inclined by 45 degrees with respect to the vertical plane and extending obliquely downward. Mounted on the face wall is a swiveling milling head 14 including a work spindle 15 turnable by means of a motor (not shown). The milling head and work spindle form a machining unit that is turnable about a swiveling axis 16 which is perpendicular to the face wall. The work spindle is borne within the swiveling milling head in an angle of 45 degrees with respect to the swiveling axis. By a corresponding rotation of the swiveling milling head about the swiveling axis, the work spindle can thus be turned from a vertical machining position indicated by solid lines to a horizontal machining position indicated by broken lines. At the end of the machine bed a chip conveyer 17 is located for removing the chips produced during the machining process.

Aside from the tools for milling, drilling, boring, or threading operations, for example, the tools for turning operations may also be inserted into the work spindle 15. The tools may be disposed in corresponding clamps or tool accommodations which are deposited in a tool magazine (not shown) and can be inserted into the work spindle by means of an appropriate tool exchanger (not shown). For carrying out turning operations on a workpiece clamped to the rotary spindle 5, a tool carrier for indexable inserts can be inserted into the work spindle. The rotary main cutting motion is then generated by the motor-driven rotary spindle. The feeding motion along the y-axis is created by moving the workpiece slide 2 with the rotary spindle arranged thereon while the feeding motions along the x- and z-axes are created by moving the travelling stand 9 and the support housing 11. Also complex turning motions may be carried out with high precision by a controlled movement along the individual travelling and turning axes. Furthermore, the common tools for milling, drilling, boring, and threading processes or the like can also be inserted into the work spindle. Therefore, all other types of machining, such as milling, drilling, boring, reaming, and threading can also be carried out on the workpieces clamped to the turning spindle before or after the turning operations. Thus, complete machining without any complicated re-clamping between different types of machines is enabled. The work spindle is therefore designed for selectively receiving, holding, and fixing a milling or lathing tool.

A workpiece exchanger 18 shown in FIG. 1 for exchanging the workpieces clamped to the rotary spindle 5 may also be insertable into the work spindle 15. The insertion of the workpiece exchanger into the work spindle may be performed by an automatic tool exchanger (not shown). The workpiece exchanger is deposited in a tool magazine (also not shown) during the machining process. The workpiece exchanger may, for example, be a workpiece gripper provided with a plurality of gripping arms 19 insertable into the work spindle via a clamping cone. The gripping arms may be operated by the internal coolant supply of the work spindle in an efficient embodiment. Since a relatively high pressure of 40 bar, for example, is generally available via the coolant supply of the machine tool, then no additional power supply is required for the operation of the gripping arms 19. With the workpiece exchanger 18 movable by means of the work spindle, the finished workpieces can be detached from the rotary spindle and transported to a workpiece deposit (not shown). The rotary spindle may also be supplied with new workpieces via the workpiece exchanger.

Figure 2:
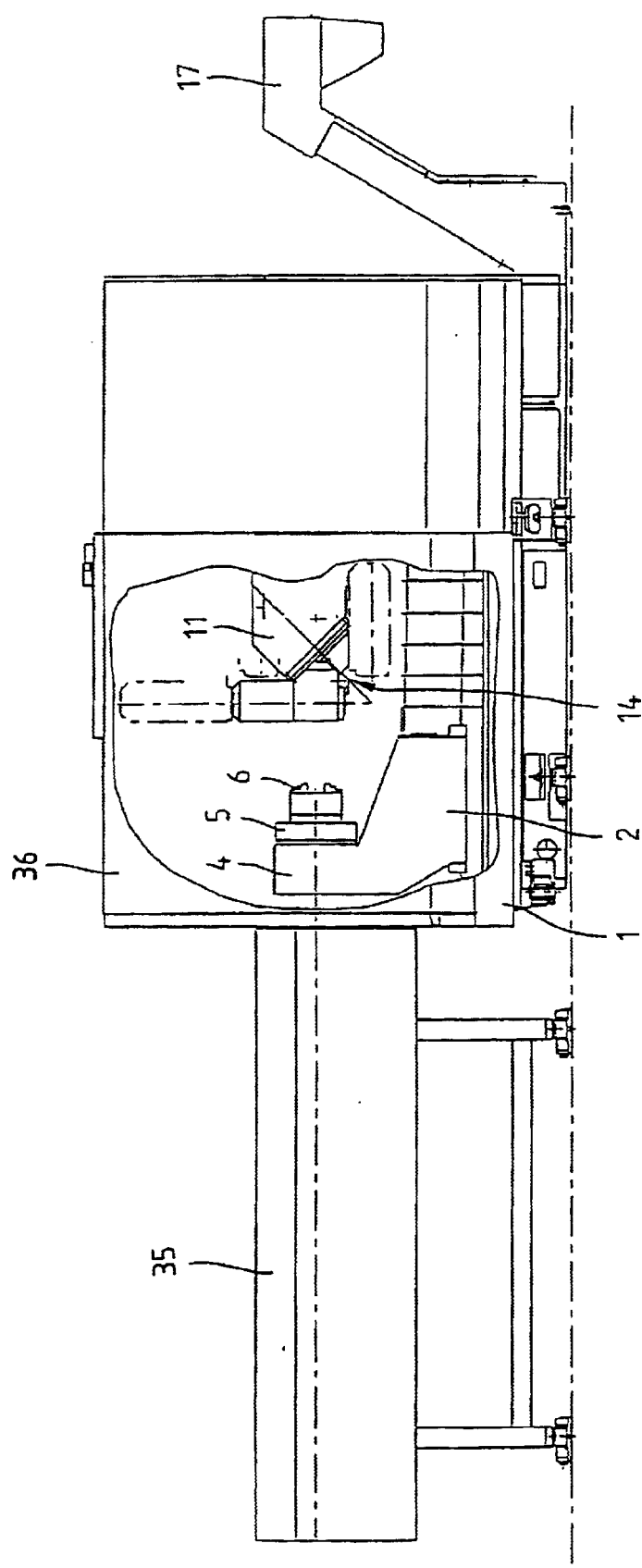
FIG. 2 is a perspective, partially cross sectional side view of the universal machine tool of FIG. 1 including a rod feeding magazine and a protective cabin.

In the further embodiment of the universal machine tool according to the present invention shown in FIG. 2, a well known rod feeding magazine 35 is located in front of the machine bed 1. With this rod magazine, rod shaped workpieces may be transported to the rotary spindle 5 formed as a hollow shaft and clamped by the three jaw chuck 6. In FIG. 2, a protective cabin 36, used to enclose the machine tool, is shown as well.

Figure 3:
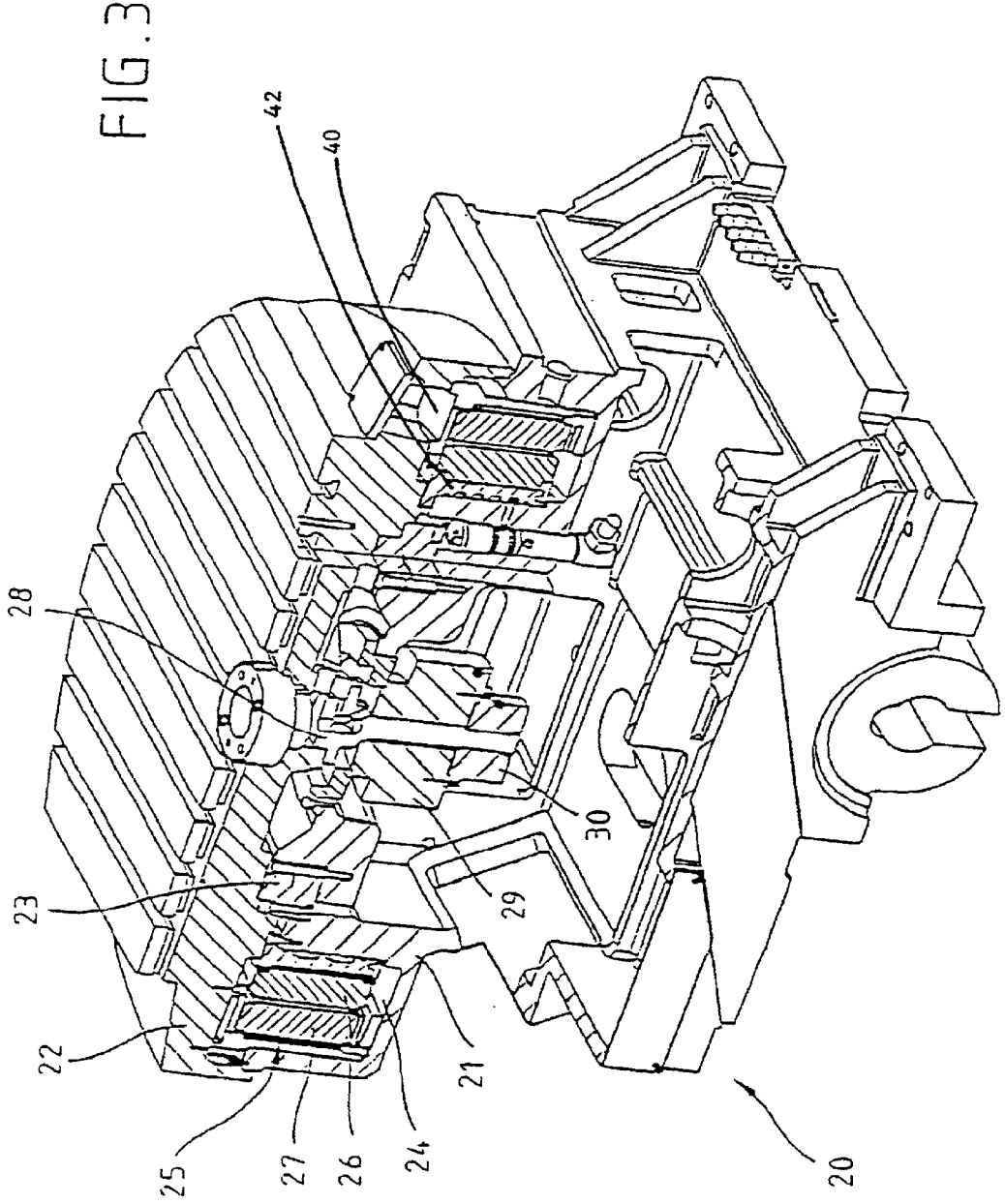
FIG. 3 is a partially cross sectional perspective view of an alternative workpiece slide comprising a turntable.

In FIG. 3, another workpiece slide 20 is shown which can be used instead of the workpiece slide 2 illustrated in FIGS. 1 and 2. This workpiece slide 20 comprises a console 21 on which a horizontal turntable 22 is borne via a ring bearing 23 so as to be rotatable about a vertical axis. The ring bearing is arranged at approximately half the radial distance between the rotational vertical axis of the turntable and the rotor. In a ring space 24, vertical to the rotational axis of the turntable within the console, is located a driving motor 25. The driving motor includes an inner stator ring 26 fixedly connected to the console on the inner wall of the ring spare and an outer rotor ring 27 fixed to the bottom side of the turntable. At a lower ring-shaped surface of the turntable 40, which is arranged in the region of a radial outer edge of the turntable, bushing 42 is located between the stator and the console. On the bottom side of the turntable and concentric to its rotational axis is a tappet 28 protruding downward. About the tappet is arranged a slip ring 29 and a shaft encoder 30. For example, the driving motor may be a collectorless ring-shaped torque motor enabling, in addition to high dynamics for carrying out turning operations, an exact positioning for carrying out milling and drilling operations in different angular positions even without a coupling or gearing. The console drive motor and turntable are therefore designed for generating the necessary high torques and rotational speeds for the machining of heavy workpieces by lathing, and also are designed to produce exact and fixed Positioning of the turntable with the workpiece clamped thereon in predetermined working positions for milling operations.

Clamping by the turntable 22 of FIG. 3 or the rotary spindle 5 of FIG. 1, for carrying out a milling process on a workpiece which is not rotationally driven, may be accomplished by the motor or a separate clamping means which can be activated if required. In addition, one or more flyweight sensors, by which an unacceptable flyweight can be detected and by which the machine tool can be turned off, may be disposed on the turntable or the rotary spindle.

Figure 4:
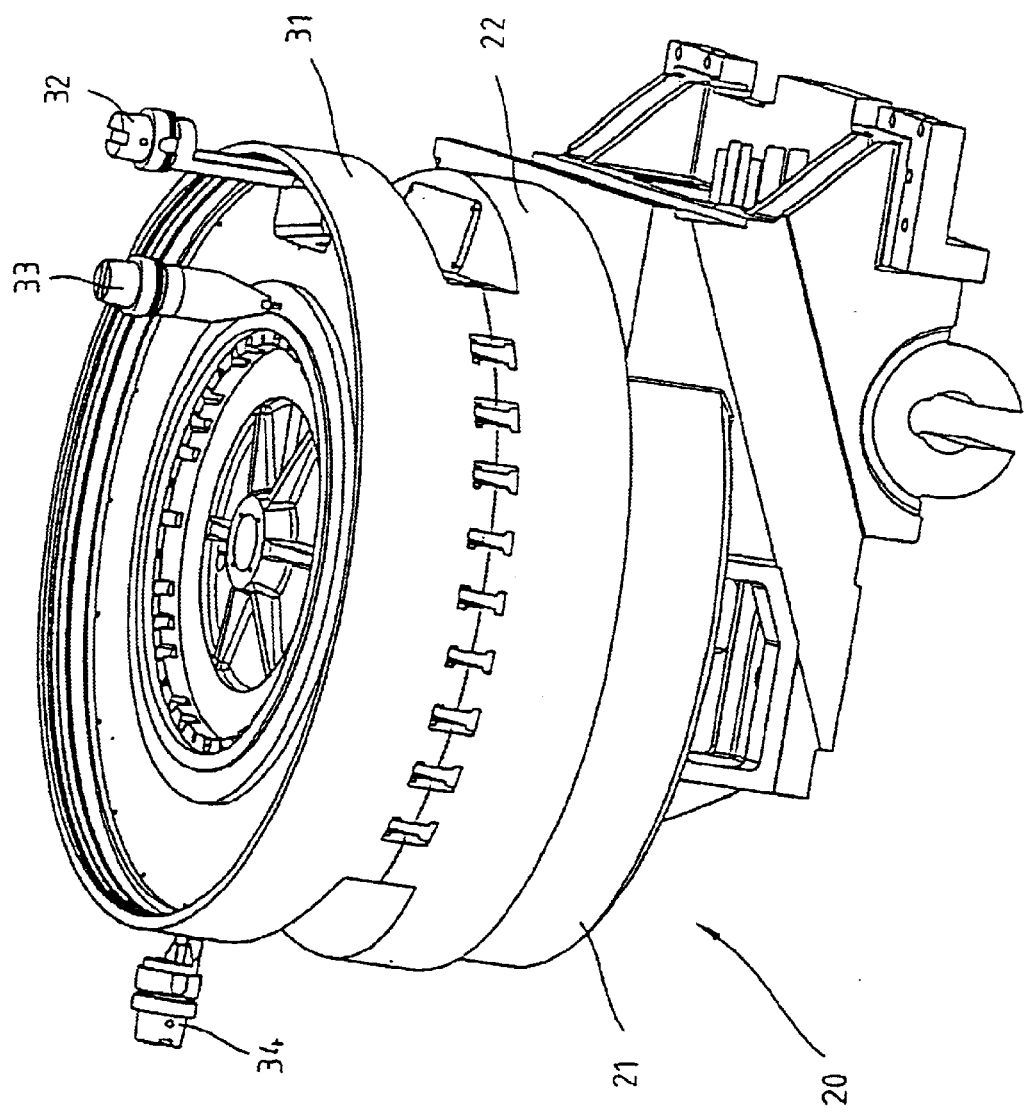
FIG. 4 is a perspective view of the workpiece slide of FIG. 3 including a clamped workpiece and turning tools for explanation of the turning operations in the universal machine tool according to the present invention.

FIG. 4 shows an embodiment for turning operations in a machine tool according to the present invention including the workpiece slide 20 according to FIG. 3. On the turntable 22, a table 31 to be machined is clamped upside down. With the aid of turning tools 32, 33, and 34 which can be inserted into the work spindle 15 shown in FIG. 1, different turning operations may be carried out with a corresponding drive of the turntable. For example, turning operations on the inner and outer side of the turntable may be carried out with the turning tools 32 and 34, and recessing works may be effected by the turning tool 33. Many other turning operations will be known to one of ordinary skill in the art.

The invention is not limited to the embodiments described in detail and shown in the drawings. The turning spindle may, for example, be disposed in a separate spindle head which is, for example, detachably mounted on a table slide. The workpiece slide may additionally comprise a rotary spindle turnable about a horizontal axis as well as a workpiece table turnable about a vertical axis.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A universal machine tool for milling and lathing operations, comprising:
    a machine base;
    a motor-driven workpiece slide horizontally movable in one coordinate axis on said machine base, said workpiece slide having a console;
    a turntable mounted on said console via a ring bearing, said turntable having a lower ring-shaped surface and rotational vertical axis;
    a gearless drive motor having a stator fixedly connected to said console and a rotor fixedly connected to said turntable; and
    a motor-driven machining unit selectively movable in two other coordinate axes, said machining unit having a work spindle designed for selectively receiving, holding and fixing a milling or a lathing tool;
    said drive motor being positioned in an annular space within said console;
    said ring bearing arranged at approximately half the radial distance between the rotational vertical axis of the turntable and the rotor;
    a bushing between said stator and said console;
    said stator being formed as an inner elongated ring fixed with its circumferential inner surface to a circumferential wall of said bushing within said annular space; and
    said rotor being formed as an outer elongated ring arranged coaxially to said stator ring and fixed to the lower ring-shaped surface of said turntable, said lower ring-shaped surface of the turntable being arranged in the region of a radial outer edge of the turntable,
    wherein the console, drive motor and turntable are designed for generating the necessary torques and rotational speeds for the machining of workpieces by lathing, and also are designed to produce exact and fixed positioning of the turntable with the workpiece clamped thereon in predetermined working positions for milling operations.

2. The universal machine tool according to claim 1, wherein said drive motor is a collectorless torque motor.

3. The universal machine tool according to claim 2, wherein said turntable comprises a central journal around which is fixed a slip ring and on which a rotational encoder is mounted.

4. The universal machine tool according to claim 1, wherein said turntable comprises a central journal around which is fixed a slip ring and on which a rotational encoder is mounted.

5. A universal machine tool for machining operations along one or more coordinate x, y, and z axes, the tool comprising a motor-driven machining unit, said machining unit comprising a work spindle for selectively receiving a rotating or lathing tool, said machine tool comprising:
    a machine tool bed;
    a motor-driven workpiece slide horizontally movable in one coordinate axis on said machine tool bed;
    a console mounted to said workpiece slide;
    a turntable for rotating a workpiece rotatably for lathing, said turntable being mounted on said console via a ring bearing, said turntable having a lower ring-shaped surface and a rotational vertical axis;
    and a gearless drive motor having a stator and a rotor, said drive motor being arranged in an annular space within said console, said stator being formed as an inner elongated ring fixedly connected to a wall in said annular space, said rotor being formed as an outer elongated ring coaxial with said stator ring, said rotor being directly fixedly connected to the lower ring-shaped surface of said turntable in the region of a radial outer edge of the turntable,
    wherein the console, drive motor and turntable are designed for generating the necessary torques and rotational speeds for the machining of workpieces by lathing, and also are designed to produce exact and fixed positioning of the turntable with the workpiece clamped thereon in predetermined working positions for milling operations.

6. The universal machine tool according to claim 5, wherein said drive motor is a collectorless torque motor.

7. The universal machine tool according to claim 5, wherein said turntable has a lower side and comprises:
    a central journal fixed to said lower ring-shaped surface;
    a slip ring arranged around said central journal; and
    a rotational encoder arranged around said central journal.

* * * * *